W. P. PAYNE.
METHOD OF VULCANIZING RUBBER.
APPLICATION FILED SEPT. 10, 1915.
1,263,462.
Patented Apr. 23, 1918.
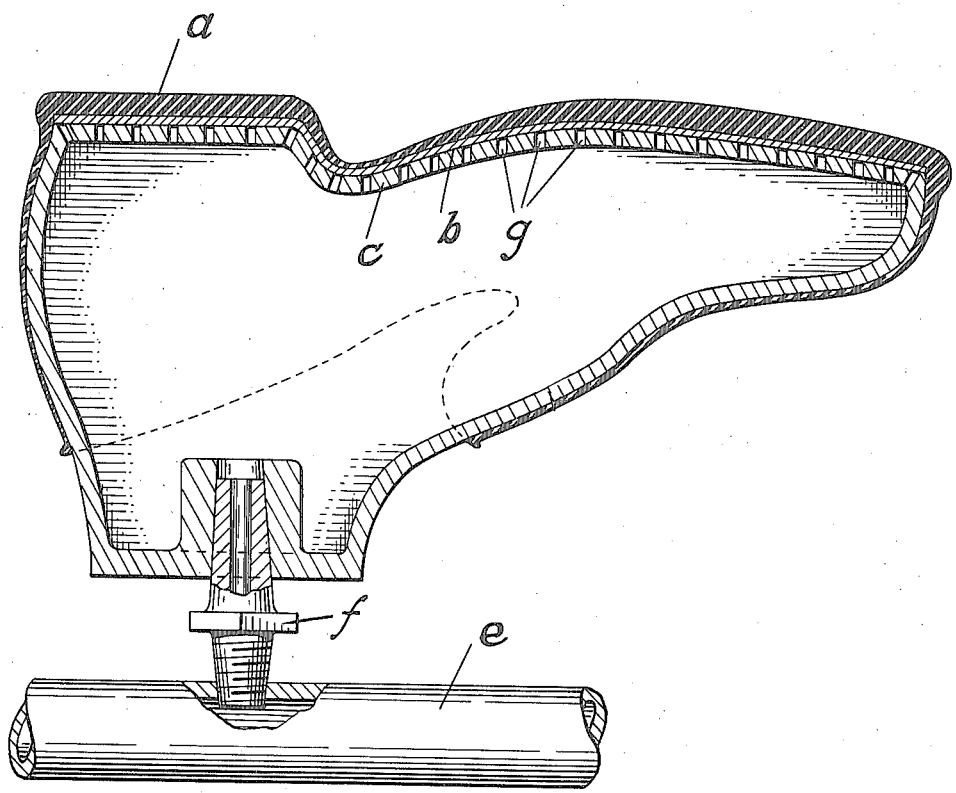
WITNESS:
S. G. Taylor.
INVENTOR
Walter Price Payne,
BY
Ernest Hopkinson
HIS ATTORNEY

UNITED STATES PATENT OFFICE.

WALTER PRICE PAYNE, OF NEW HAVEN, CONNECTICUT, ASSIGNOR TO L. CANDEE & CO., A CORPORATION OF CONNECTICUT.

METHOD OF VULCANIZING RUBBER.

1,263,462.  Specification of Letters Patent.  Patented Apr. 23, 1918.

Application filed September 10, 1915.  Serial No. 49,865.

*To all whom it may concern:*

Be it known that I, WALTER PRICE PAYNE, a citizen of the United States, residing at New Haven, county of New Haven, State of Connecticut, have invented certain new and useful Improvements in Methods of Vulcanizing Rubber, of which the following is a full, clear, and exact description.

This invention relates to methods of vulcanizing rubber and similar plastics and has for its primary object the vulcanizing of such plastics in association with certain fibrous and porous materials which have heretofore been partially or totally destroyed when subjected to such treatment.

Formerly it was practically impossible to associate rubber and similar vulcanizable plastics with certain fibrous materials such as leather, and thereafter subject them to the vulcanizing process without wholly or partially destroying the leather, and the usual practice has been to apply the leather to the rubber after the latter has been vulcanized. In such instances it is usually necessary to cement the vulcanized rubber and leather together, but the bond thus secured is not so strong as when the unvulcanized rubber is firmly pressed into intimate contact with the leather and then subjected to the vulcanizing process. In many instances however, if leather were used, it would be necessary to assemble it with the rubber during the original building up of the article, that is to say, before it has been subjected to the vulcanizing process, and in such instances it is therefore necessary to use some substitute for the leather which will not be injuriously affected during the vulcanizing process. For the above reasons it will thus be obvious that the combined use of leather and rubber has heretofore been considerably limited.

There is known to be considerable moisture prevalent in both the unvulcanized plastic and leather and it is somewhat problematic what is the actual cause of the injurious effect of the vulcanizing treatment upon the leather. From investigations which have been made it would seem to appear that this injurious effect is produced by the vapors or gases which are generated and given off by the plastic material during the vulcanizing process. These vapors or gases being under more or less compression within the plastic material will naturally flow into a space of less pressure or follow the path of least resistance, and where a material of a fibrous and porous nature as leather is assembled with the plastic in close proximity thereto, it is manifest that the vapors of the plastic will pass into and permeate the leather.

It is usually desirable to produce an intimate union between the plastic and leather and it is the practice in the vulcanization of such articles to subject them to the influence of an external compacting pressure to effect this intimate association. This external compacting pressure exerted upon the entire surface of the article will result in entrapping the heated vapors within the materials composing the article, which is probably accountable for the partial or total destruction of the leather.

I have found however, that if the heated vapors or gases can be removed as soon as they enter the leather, or at least before an excessive amount collects, that the vulcanization may be carried on without the usual injurious effect upon the leather, and that the close and intimate union of the leather and rubber will be produced. The final product will thus have the required strength and wearing properties and the leather portion of the article will remain in the same condition as when it was originally assembled with the plastic material.

It is possible to remove more or less of the generated vapors and gases before the compacting pressure is applied, and in such instances the entire article may be subjected to a reduced external pressure whereby the entrapped fluids may seep out to the surrounding atmosphere of lesser pressure. After this has been carried on for a sufficient time, the compacting pressure may be applied and the vulcanization completed.

To produce the best results however, and to most effectively eliminate the vapors and gases, I prefer to subject the exterior of the article to a predominating or compacting pressure and to bring the porous interior of the leather into communication with a lesser pressure. In carrying out this process, it is possible to subject the interior of the leather to the lesser pressure previous to, simultaneously with, or subsequent to, the application of the compacting pressure and in fact these pressures may be applied in any order desired and to any extent that will result in the removal of the injurious vapors or gases substantially as fast as they are generated, or before they can injuriously act upon the leather. I prefer however to apply the reduced pressure simultaneously with the compacting pressure for a period of time sufficient to eliminate all, or substantially all, of the vapors or gases which have been generated, and to insure the desired compaction and uniting together of the component parts when the vulcanization has been finally completed.

While there are numerous devices which may be utilized in carrying out my invention, and many articles wherein rubber and leather may be utilized, I have, for convenience, shown but a single apparatus in the accompanying drawing for use in the manufacture of rubber footwear in which an inner sole of leather is provided.

The drawing is a longitudinal central sectional elevation of an apparatus for the practice of my invention having an overshoe supported thereon.

The overshoe $a$ is of any usual or preferred style having a portion of leather, in this instance an inner sole $b$, forming a part thereof. The shoe is supported on a last or form $c$ which, for the purpose of my invention is made hollow and secured to a conduit $e$ through the hollow connection $f$, whereby the interior of the form is brought into communication with the conduit.

The form is further perforated by one or more holes $g$ thereby bringing the leather inner sole into communication with the conduit $e$. With such an apparatus all that is necessary for the practice of my invention is to exert the required pressure upon the exterior of the article while maintaining the interior of the conduit $e$ in communication with a lesser pressure, preferably in communication with a reduced pressure. The external pressure in this instance will preferably be a fluid pressure and for this purpose the apparatus may be placed in a pressure vulcanizer of any usual or preferred construction and the pipe $e$ connected to a suction device. Such an apparatus affords means whereby the external and internal pressures may be regulated as desired and may be maintained entirely under the control of the operator, so that as the vulcanization process is progressing the deleterious vapors and gases may be withdrawn and the required compaction effected.

What is claimed is:—

1. The method of manufacturing rubber articles which comprises assembling portions of rubber and leather so that the pores of the leather will afford passages for the escape of vapors and gases generated during vulcanization, subjecting the article to a compacting pressure, exerting a suction on the leather side of the article and bringing the entire article to the vulcanizing temperature and maintaining said temperature until vulcanization is completed.

2. The method of manufacturing rubber articles which comprises assembling portions of rubber and leather together so that the pores of the leather will afford passages for the escape of vapors and gases generated in the rubber, subjecting the rubber side of the article to a fluid pressure, exerting a suction on the leather side of the article and bringing the entire article to the vulcanizing temperature and maintaining said temperature until vulcanization is completed.

Signed at New Haven, Conn., Sept. 4, 1915.

WALTER PRICE PAYNE.